(12) United States Patent  
Peregrin Emparanza et al.

(10) Patent No.: US 8,472,984 B2  
(45) Date of Patent: Jun. 25, 2013

(54) AMBIENT TELECOMMUNICATION SYSTEM, A METHOD FOR OPERATING SUCH SYSTEM, AND A COMPUTER READABLE MEDIUM

(75) Inventors: Jorge Peregrin Emparanza, Delft (NL); Aki Sakari Harmi, Eindhoven (NL); Pavankumar Murli Dadlani Mahtani, Eindhoven (NL)

(73) Assignee: Konklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/264,401

(22) PCT Filed: Apr. 12, 2010

(86) PCT No.: PCT/IB2010/051568  
§ 371 (c)(1), (2), (4) Date: Oct. 14, 2011

(87) PCT Pub. No.: WO2010/119391  
PCT Pub. Date: Oct. 21, 2010

(65) Prior Publication Data  
US 2012/0028619 A1  Feb. 2, 2012

(30) Foreign Application Priority Data  
Apr. 17, 2009 (EP) ..................................... 09158139

(51) Int. Cl.  
*H04W 4/00* (2009.01)

(52) U.S. Cl.  
USPC ..................... 455/461; 455/414.1; 455/404.2; 455/407; 455/462; 379/219

(58) Field of Classification Search  
USPC .... 455/414.1, 404.2, 407, 461, 462; 379/219; 704/228  
See application file for complete search history.

(56) References Cited

U.S. PATENT DOCUMENTS

2003/0118200 A1* 6/2003 Beaucoup et al. ............ 381/110  
2005/0269580 A1* 12/2005 D'Angelo ....................... 257/88

FOREIGN PATENT DOCUMENTS

| EP | 1289247 A2 | 3/2003 |
| EP | 1686835 A1 | 8/2006 |
| WO | 2004061364 A2 | 7/2004 |
| WO | 2007072338 A1 | 6/2007 |

OTHER PUBLICATIONS

Harma: Ambient Telephony: Scenarios and Research Challengesl Interspeech. 8th Annual Conference of the International Speech Communication Association, Aug. 2007, Antwerp, Belgium, vol. 1, pp. 381-384.

* cited by examiner

*Primary Examiner* — Wayne Cai  
*Assistant Examiner* — Chuck Huynh (57) ABSTRACT

An ambient telecommunication system (10) is provided. The system (10) comprises a set of transmitters (11) and a corresponding set of receivers (12) for transmitting and receiving electronically or digitally encoded sound between two or more conversing parties. The ambient telecommunication system further comprises at least one light emitting unit (14) connected to a transmitter or receiver, and is configured to emit light when its corresponding transmitter (11) or receiver (12) is in an active mode. A method for operating the system, and a computer readable medium carrying code segments for carrying out the method is also provided.

12 Claims, 3 Drawing Sheets

AMBIENT TELECOMMUNICATION SYSTEM, A METHOD FOR OPERATING SUCH SYSTEM, AND A COMPUTER READABLE MEDIUM

FIELD OF THE INVENTION

This invention pertains in general to the field of ambient telecommunication systems, method for operating such system, and a computer readable medium comprising code segments for carrying out the method. More particularly the invention relates an ambient telecommunication system, comprising a set of transmitters and a corresponding set of receivers for transmitting and receiving an electronically or digitally encoded information signal, e.g. comprising speech information, between two or more conversing parties, a method for operating such system, and a computer readable medium comprising code segments for carrying out the method.

BACKGROUND OF THE INVENTION

Mediated communication is not supported to its full potential by current communication media. The meaning of a personal relationship cannot be felt, and it is far from a "face to face" feeling.

The meaning of the personal relationship between communicants is especially relevant concerning important contacts and the communication habits and experience between them.

In this respect ambient telephony has been developed. Ambient telephony is an idea of blending communication into a home environment. The system consists of a set of loudspeakers and microphones around the house, which detect when the user moves and renders the call only in the area of the house where the person is, allowing free mobility, providing a 'follow-me' effect to the user. This allows for completely hands-free conversations, without the boundaries of a product or a physical location. It aims to elicit the feeling of a visit instead of just a phone call and to lower the awareness of mediation in the communication.

Several factors are important for the success and optimal experience of ambient telephony. Some examples of these are the sound quality and its spatial distribution, the extent to which the product blends with the home environment, the ease of use and the experience perceived by the users. Within the experience desired of ambient telephony, is social presence (also known as feeling of being together in a mediated environment).

Current ambient telephony suffers from low feedback of social presence of the remote caller. The freedom of movement that ambient telephony provides makes particularly relevant to provide feedback about the follow-me effect and where the call is being rendered. In order to provide with a rich feeling of being together, i.e. social presence, it is relevant to provide users with a feeling of the remote caller being there. Ambient telephony of today (a system installed in the ceiling of a room) also suffers from low feedback of the follow-me effect. More precisely, users are not sure whether the call followed them or not. Furthermore, ambient telephony suffers from lack of representation of the remote caller. While using ambient telephony, the user may miss a certain visual cue of the remote caller and a certain target to address in the conversation.

Thus, there is a need for a development within the field of ambient telephony allowing for improved follow-me effect, and an improved representation of the remote caller, including potential mood and/or frame of mind.

Accordingly, the present invention preferably seeks to mitigate, alleviate or eliminate one or more of the above-identified deficiencies in the art and disadvantages singly or in any combination and solves at least the above mentioned problems by providing an ambient telephone communication system, a method, and computer-readable medium according to the appended patent claims.

An idea of the present invention is to provide an ambient telephone system comprising a light emitting unit configured to display light having different properties depending on the information signal, comprising speech information, sent between at least two conversation parties. The color and intensity is selected such that it resembles certain behaviors of intimacy and immediacy. In this way the ambient telephone system provides a feeling of social presence (feeling of being together) by rendering a meaningful abstract representation of the remote caller, and the light emitting unit functions as an object at which the user may focus their attention on during the call.

Consequently, an advantage of the present invention is that it makes the user experience richer because intimacy and immediacy cues are rendered resembling a face to face communication. Moreover, it also provides feedback about how the conversation is being performed.

An important feature of the present invention is the display of light from a phone-let from a set of one or more phone-lets, where the call is rendered in a certain way that the user associates with his/her remote caller. Certain properties of the emitted light may further enrich the calling experience by detecting and rendering meaningful properties of the caller and/or conversation via motion patterns. This way the phone-let becomes a meaningful representation of the caller, providing with a feeling that both communicants are in the same room and feedback of movement when the user moves around in the home.

According to an aspect of the invention an ambient telecommunication system is provided. The ambient telecommunication system comprises a set of transmitters and a corresponding set of receivers for transmitting and receiving an electronically or digitally encoded information signal between two or more conversing parties. Moreover, the ambient telecommunication system comprises at least one light emitting unit, connected to a transmitter or receiver, wherein the light emitting unit is configured to emit light when its corresponding transmitter or receiver is in an active mode.

According to another aspect of the invention a method for operating an ambient telecommunication system for transmitting and receiving an information signal between two or more conversing parties is provided. The method comprises selecting a transmitter and a corresponding receiver, among a set of transmitters and corresponding receivers. The method further comprises transmitting and receiving an electronically or digitally encoded information signal, from the transmitter and the receiver. Furthermore, the method comprises emitting light from a light emitting unit connected to the selected transmitter or receiver.

In yet another aspect a computer-readable medium is provided, having embodied thereon a computer program for processing by a computer. The computer program comprises a code segment for selecting a transmitter and a corresponding receiver, among a set of transmitters and corresponding receivers. Moreover, the computer program comprises a code segment for transmitting and receiving an electronically or digitally encoded information signal from the transmitter and the receiver. Furthermore, the computer program comprises a code segment for emitting light from a light emitting unit, connected to the selected transmitter or receiver.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

An experiment with a basic set up of ambient telephony built into the ceiling of a home-like laboratory, showed a positive trend in ambient telephony towards social presence, in comparison with cordless telephony. There was a significantly better result ($p<0.05$) for ambient telephony over cordless telephony, regarding the feeling of meeting the other party and how meaningful the experience was. Participants commented very positively on ambient telephony considering it more comfortable and convenient than cordless telephony, especially regarding its hands-free and location-free use. Some participants commented about feeling their contact closer, as if they were in the same room.

In an experiment carried out in Philips' HomeLab, comparing ambient telephony and cordless telephony, participants noticed the sound sources, such as speakers in the ceiling, and in many cases showed intimacy behaviors, such as sending kisses, nodding, staring, etc., towards the sound sources—consciously and unconsciously. On the other hand, there were negative remarks about "talking to the ceiling" or "the emptiness", the "unnatural" position of the sound, not having anything to look at. This was considered as annoyance when multitasking.

In later experiments, an array of simple and neutral looking embodiment phone-units carried the system including a meaningful color light that lighted up in the phone-unit that rendered the call. This showed promising results with significant improvements in social presence and overall better comments of comfort and convenience. Users had explicit comments about the benefit of light in respect of focusing their attention during a call, improved feedback of the follow-me effect, the feeling of presence of the remote caller, and improved representation of the remote caller. The users expressed that the light dragged attention and attracted them to look at it during the conversation and when there is no speech involved. Thus, the feeling of contact between the conversation parties was improved, which also allowed for silent presence. Once the light is there, the conversation parties know that they are being heard and that the other party is there.

The present inventors have thus realized that by providing a visual connection between the conversation parties will improve telephone experience.

Light does not need direct attention to be understood, requires low cognitive effort, no dedication, neither creates obligations. In addition, light is scalable within the dimensions for ambient systems and its modulation could be used to represent means of immediacy and intimacy. Also, light is a valid way to show little information in an understandable and unobstructive manner. Color light may be used to elicit emotional communication and help seamlessly transitions between passive and active modes. Colored light can be used as peripheral display, giving just enough information, being meaningful, flexible and suitable for ambient telephony. Furthermore, light may provide a feeling of presence, without a need to be rich or explicit.

Figure 1:
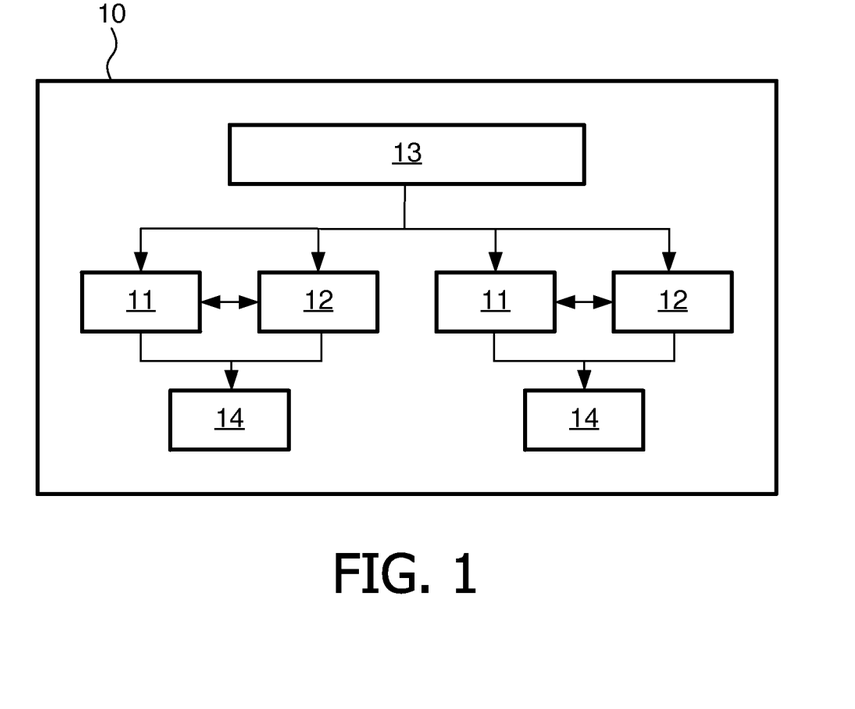
FIG. 1 is a schematic illustration of a system according to an embodiment.

In this respect the present inventors extracted and compiled the benefits of the above-identified experiments by providing an ambient telecommunication system 10, for transmitting and receiving an electronically or digitally encoded information signal, e.g. comprising sound, such as speech information, between two or more conversing parties. The ambient telecommunication system 10 comprises a set of transmitters 11 and a set of receivers 12. This may be realized by integrating a transmitter 11 and a receiver 12 in a transmitting/receiving unit, such as a phone-let, and having the telecommunication system 10 comprising a set of such transmitting/receiving units. The transmitter 11 may for example be a loudspeaker and the receiver 12 may for example be a microphone. The different transmitters 11 and receivers 12 may be located in different confined spaces, such as rooms, so as to allow for sound transmission and/or reception in the different confined spaces. The system 10 comprises a controlling unit 13. The controlling unit 13 comprises an algorithm, controlling the sound transmission and/or reception, such that the transmitter 11 and receiver 12 in a location of strongest sound reception are the ones that are activated. Preferably, the algorithm is such that voices are in prevalence over other forms of sound, such as home equipment. Thus, the system detects when the user moves and renders the call only in the area of for example a house where the user is located. This allows for free mobility, and complete hands-free conversations, without the boundaries of a product or physical location.

Each transmitter 11 and/or receiver 12 may be connected to a corresponding light emitting unit 14. Preferably, the light emitting unit 14 is integrated in the same unit as the corresponding transmitter 11, such that the light emitting unit 14 may be activated to emit light when the transmitter 11 transmits information, such as speech information. Thus, the light emitting unit 14 may be integrated in a transmission/reception unit, in accordance with above. The controlling unit 13 is configured to, such as comprising an algorithm for, activating light emission from the light emitting unit 14 corresponding to the active transmitter 11. In this way, light can be emitted from the same location as sound is transmitted from. In this way a target to focus attention on during the call is accomplished, while simultaneously improving a follow-me effect, since the user knows what transmitter 11 and/or receiver 12 that is active from the emitted light.

In an embodiment the information signal comprises speech information which originates from the sound of the telephone conversation between the conversing parties. However, the information signal may also comprise an identity of the caller, similar to telephone number presentation, such that the light emitting unit emits light having a certain color and/or intensity depending on the identity of the caller. Hence, different colors and/or intensities may be preset in the controlling unit, depending on the identity of the caller.

In another embodiment the information signal comprises video information, for example obtained using a camera located at either side of the communications channel. Hence, when the transmission/reception unit is connected to a camera the controlling unit may process the video information and active the movement member accordingly, to visualize e.g. the facial expression or body language of the user on the remote side. The controlling unit may process the video information using commonly known facial detection techniques or body language identification techniques.

The light emitted from the light emitting unit 14 may be preset by the user in a certain color. Different colors may correspond to the meaning remote callers have for the user, respectively. This light would glow in the phone-let that renders the call, moving from one phone-let to another as the user moves between the different detection fields of the phone-lets. The color of the emitted light may also allow the user to recognize the remote caller before the conversation, if the emitted color is used as a color-ring tone, during the conversation, reinforcing the feeling of being there by matching voice and visual, and when there is no speech involved. When multiple callers are communicated to, such as in a telephone conference mode, the different callers may be visualized when talking by different colors.

In this way, sound and color light match, with the sound, such as speech, transmitting the message, and color light acting as meaningful abstract representation of the remote caller. This combination has proved to enrich the user experience.

It is also possible to configure the emitted light to correspond to the mood and/or frame of mind the caller has. For example, the caller may indicate on his/her telecommunication system, that he/she is happy, sad, or angry, which may be visualized by the light emitting unit 14 by emitting green, blue, or red, respectively. Thus, the mood and/or frame of mind of the caller may be visualized to the user receiving the call.

It should be appreciated that the light emitting unit 14 is not limited to be located at the side remote to the caller. Accordingly, any or each side of the communication channel may e.g. be provided with a light emitting unit, which at least visualizes the incoming information signal, e.g. comprising speech information, from the user on the remote side.

Moreover, any user on a remote side may receive a visual representation of the mood and/or frame of mind of the user on the other side by means of the light emitting unit.

Also, the intensity of the emitted light may correspond to a mood and/or frame of mind of the user on the remote side during the telephone conversation. Hence all information signals, and thus speech information, sent between the conversation parties may be analyzed by the controlling unit 13, and be translated into movement by the movement member, e.g. located at each of the conversation parties, thereby providing continuous feedback to the conversation parties. Accordingly, also the mood and/or frame of mind of a caller having a pre-set caller identification color may be visualized to the user.

The controlling unit 13 may be located at the transmitting, or the receiving end of the communication channel. When it is in the transmitting end, the control information may be sent from the location of the first user to the location of the second user as side information of the speech data.

In an alternative embodiment the controlling unit 13 is part of a service provided by a communication operator such that the analysis and generation of the control messages is performed in a central server which is a part of the communication infrastructure.

Figure 2:
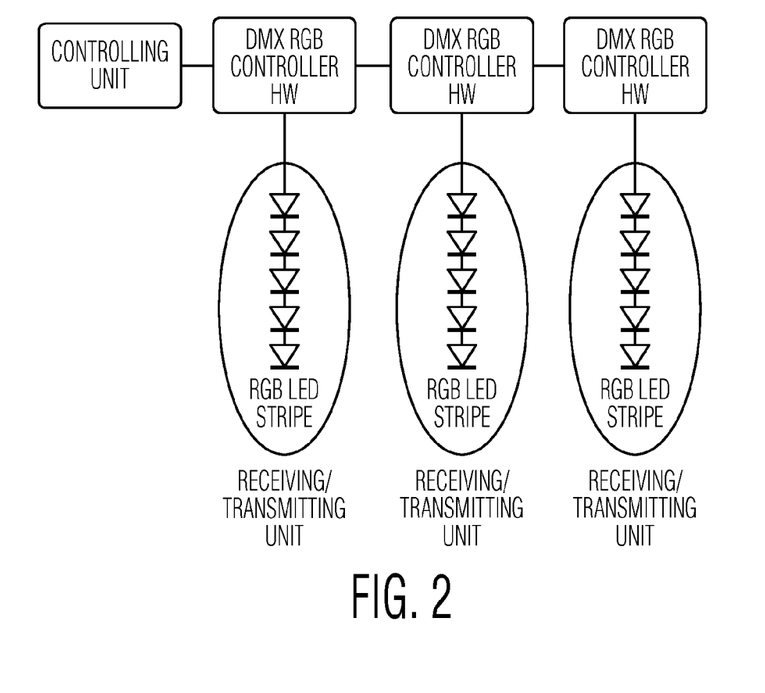
FIG. 2 is a schematic illustration of a system according to an embodiment.
Figure 3:
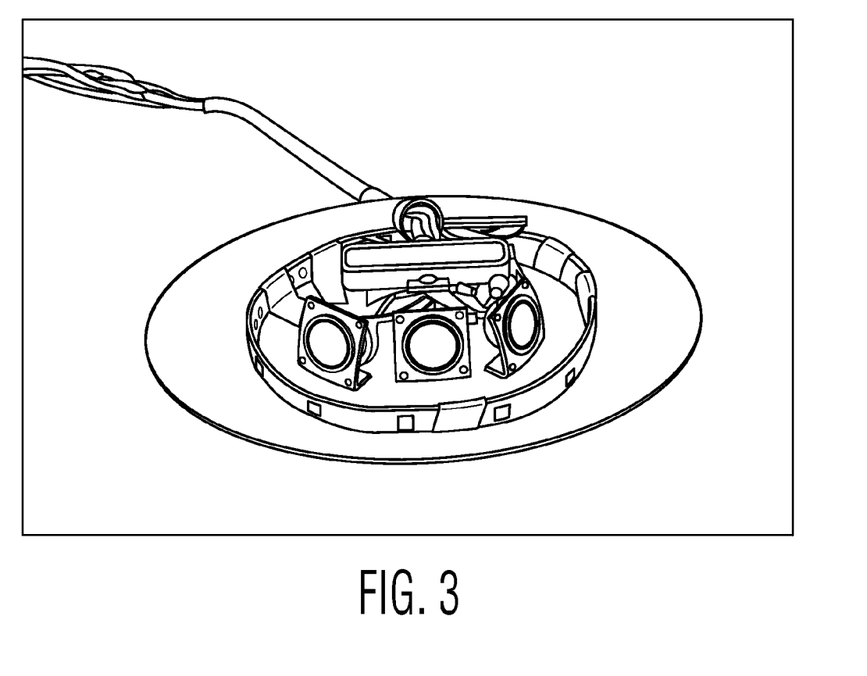
FIG. 3 is an illustration of a RGB LED stripe according to an embodiment.

The light emitting unit 14 may be an array of RGB LEDs, such as a RGB LED stripe, as indicated in FIGS. 2, and 3. The array of RGB LEDs may be controlled by DMX light controllers or any other light controller, as indicated in FIG. 2. The light emitting unit may also comprise optical lenses for optimal diffusion of the emitted light. The array of RGB LEDs and optical lenses may be combined. As indicated above, the emitted light may be activated by a similar algorithm that the one that controls the voice tracking between phone-lets in known ambient telephony systems. However, in embodiments of this invention, this algorithm allows for at least a follow-me effect, as indicated above. The control unit 13 may be operable, such that the user may program how the colors, lights, intensity of lights, etc., should correspond to different callers, moods and/or frame sets, etc. A similar controller is integrated in the Philips' Living Colors lamp. Thus, the user may be able to assign colors to contact through an interface in the telecommunication system 10, such as a transmission/reception unit, such as a phone-let.

In an embodiment the intensity of the emitted light and/or emission pattern, such as lighting different parts of the frame of the transmission/reception unit, transmitter 11, receiver 12, light emitting unit 14, etc., may be modulated in accordance to several factors, such as the distance from the device, such as distance from the remote caller, gazing at the device, such as the transmitter 11 (as if "you are looking at me as we talk").

In an embodiment, the controlling unit is configured to process the information signal sent between the parties based on content analysis. Based on this content analysis of the conversation the controlling unit may control the emitted light, intensity of the light or light pattern during the conversation procedure, to envision changes in mood and/or mind set of the other conversation party. In particular, commonly known algorithms for automatic detection of emotion in speech may be used. The content analysis may e.g. be one of many commonly known Speech Activity Detector algorithms.

In an embodiment the speech activity in the incoming information signal is analyzed by means of the controlling unit 13.

In an embodiment the controlling unit 13 is configured to change the emitted light from the light emitting unit during the conversation procedure, to envision changes in mood and/or mind set of the other conversation party utilizing the content analysis of the conversation. In particular, commonly known algorithms for automatic detection of emotion in speech may be used. Such content analysis may for example be based on long pauses in the conversation, activity from the other conversation party, the incidence of filler words, such as "huh . . . ", "hm . . . ", "yeah . . . ", or positive words, such as "great", "good", etc.

These mood and/or frame set words may be integrated as indentifying keywords in a predefined list. Thus, it is possible to analyze the boredom, mood, and intimacy of the conversation, and render this with light patterns on the transmission/reception unit, such as a phone-let. This can further indicate if the call is a functional or emotional call. Volume, and changes in volume, such as shouting or whispering, may also be a factor affecting the emitted light, light intensity, lighting pattern etc., to visualize mood or mind set, or changes thereof, of the other conversation party or parties. Other factors affecting the emitted light, light intensity, lighting pattern etc., to visualize mood or mind set, or changes thereof, of the other conversation party or parties, may be the activity or passivity of the other conversation party or parties, movement of the other conversation party or parties.

In another embodiment the presence of more than one user may be indicated by the emitted light, light intensity, lighting pattern etc. If there is more than one user having different distances to the transmission/reception unit, such as the phone-let, the transmission/reception unit will light up according to the relative distance of the phone transmission/reception unit to the user as to the remote user. Thus, if there are two people in the remote location, and one is further away from the phone than the other, then two transmission/reception units will light up in different colors, or with different color intensities, where the farthest phone let will represent the remote user who is farthest from the transmission/reception unit. If both remote people get closer together, then for example only one transmission/reception unit lights up with increasing intensity. For example the relative distance may be calculated utilizing at least one microphone.

By utilizing Speech Activity Detection (SAD) in the controlling unit the movements and postures of the movement member may be controlled such that they represent the current speech activity of the incoming caller. Using SAD information only, the movements can be synchronized by active speech and pauses.

In an embodiment the content analysis comprises an algorithm for estimation of the pitch of speech activity. Pitch is one of the most important prosodic cues which also in the case of a natural talker is often synchronous with the head movements. There are several commonly known pitch estimation techniques available. For example, in an embodiment when the controlling unit detects a rising pitch contour, it may control the light emitting unit to emit light with increasing intensity, and a detected decreasing pitch contour will affect the emitted light unit to emit light having decreasing intensity.

In an embodiment the controlling unit comprises software for automatic speech recognition (ASR) and natural language interpretation. In this simplest case this may be a limited vocabulary ASR system capable of spotting words contained in a pre-defined rule-base which converts the spotted words into movements, for example, in ways illustrated in FIGS. 4 and 5. In an alternative embodiment the controlling unit comprises software for ASR combined with natural language interpretation which may derive high-level contextual information about the topics being discussed by the users.

Depending on the result of the content analysis of the information signal the controlling unit may control the light properties, such as color and/or intensity, of the light emitted by the light emitting unit.

In an embodiment the light emitting unit 15 is provided as an integral part of the transmission/reception unit.

In an embodiment, the transmission/reception unit may be integrated in everyday objects, such as a TV. In this way, if the user happens to be next to or in front of his TV, the TV would switch on and provide not just with light but with meaningful representation of the remote caller via the screen. Other types of transmission/reception units may be selected from the group comprising photo frames, tablets, refrigerators, couches, etc. The telecommunication system described herein may at least be combined or integrated with devices or combination of devices selected from the group comprising ambiPhone, a dedicated device for ambient telephony, ambi-Phone in ambilight TV, ambiPhone in photoframe scalable from use of light to use of picture or video, magic mirrors, HiFi systems, etc.

The controlling unit 13 may be any unit normally used for performing the involved tasks, e.g. a hardware, such as a processor with a memory.

In an embodiment the transmission/reception unit and/or light emitting unit is configured to be mounted onto a wall or the ceiling of a room.

In an embodiment the transmission/reception unit and/or light emitting unit is configured to be mounted onto an essentially horizontal surface, such as a table.

In an embodiment the transmission/reception unit and/or light emitting unit is configured to be mounted onto any surface.

Figure 4:
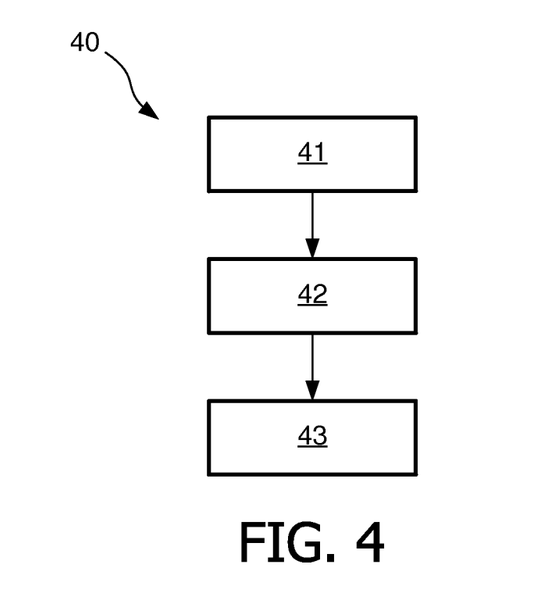
FIG. 4 is a flowchart of a method according to an embodiment.

In an embodiment, according to FIG. 4, a method 40 for operating an ambient telecommunication system 10 for transmitting and receiving an information signal between two or more conversing parties is provided. The method comprises selecting 41 a transmitter 11 and a corresponding receiver 12, among a set of transmitters 11 and corresponding receivers 12. The method further comprises transmitting 42 and receiving an electronically or digitally encoded information signal, from the transmitter 11 and the receiver 12. Moreover, the method comprises emitting 43 light from a light emitting unit 14, corresponding to the transmitter 11 or receiver 12.

In an embodiment the step of selecting a transmitter 11 and a corresponding receiver 12, among a set of transmitters 11 and corresponding receivers 12, comprises selecting the transmitter 11 and a corresponding receiver 12 being closest to the user.

In an embodiment the method comprises steps for performing any of the functionalities in the ambient telephone communication system according to some embodiments.

Figure 5:
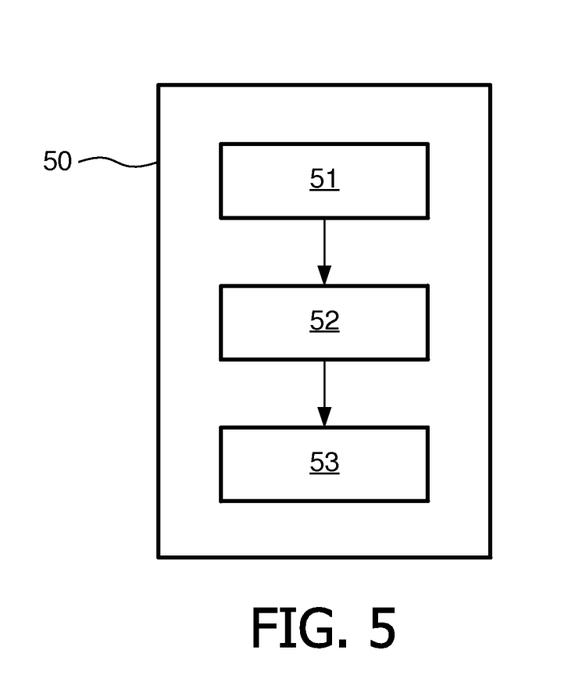
FIG. 5 is a flowchart of a computer program according to an embodiment.

In an embodiment, according to FIG. 5, a computer-readable medium 50 is provided, having embodied thereon a computer program for processing by a computer. The computer program comprises a code segment 51 for selecting a transmitter 11 and a corresponding receiver 12) among a set of transmitters 11 and corresponding receivers 12. The computer program further comprises a code segment 52 for transmitting and receiving an electronically or digitally encoded information signal from the transmitter 11 and the receiver 12. Moreover, the computer program comprises a code segment for emitting light from a light emitting unit 14 connected to the selected transmitter 11 or receiver 12.

In an embodiment the computer-readable medium comprises code segments arranged, when run by an apparatus having computer-processing properties, for performing all of the method steps defined in some embodiments.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. An ambient telecommunication system comprising:
   a plurality of transmitters disposed at different positions in a first location for rendering sound represented by encoded information in a signal communicated from a conversing party in a second location;
   a plurality of receivers disposed at different positions in the first location for receiving sound from a conversing party in the first location for encoding in an information signal to be communicated to the conversing party in the second location;
   at least one light-emitting unit disposed in the first location and configured to emit ambient light rendering properties represented by encoded information in a signal communicated from the conversing party in the second location, said encoded information being related to at least one of:
   a property of said conversing party;
   conversation from said conversing party;
   a controlling unit for selectively activating one of said transmitters, on of the said receivers and one of said at least one light-emitting unit based on a current position of the conversing party in the first location.

2. The ambient telecommunication system according to claim 1 where at least one of said transmitters, said receivers, and said at least one light-emitting unit are integrated in a transmission/reception unit.

3. The ambient telecommunication system according to claim 1 comprising a plurality of light-emitting units, each being disposed in the vicinity of a respective one of the transmitters, said controlling unit selectively activating the light emitting unit in the vicinity of the selectively-activated transmitter.

4. The ambient telecommunication system according to claim 1 where the at least one light emitting unit comprises an array of RGB LEDs.

5. The ambient telecommunication system according to claim 1 where at least one of the transmitters comprises a loudspeaker and at least one of the receivers comprises a microphone.

6. A method for operating an ambient telecommunications system for communicating signals including encoded information between at least two conversing parties, the method comprising the steps of:
   selectively activating one of a plurality of transmitters disposed at different positions in a first location for rendering sound represented by encoded information in a signal communicated from a conversing party in a second location;
   selectively activating one of a plurality of receivers disposed at different positions in the first location for receiving sound from a conversing party in the first location for encoding in an information signal to be communicated to the conversing party in the second location;
   selectively activating one of at least one light-emitting unit disposed in the first location and configuring said light-emitting unit to emit ambient light rendering properties represented by encoded information in a signal communicated from the conversing party in the second location, said encoded information being related to at least one of:
   a property of said conversing party;
   conversation from said conversing party;
   where the selective activations of on of said transmitters, one of said receivers and one of said at least one light-emitting unit is based on a current position of the conversing party in the first location.

7. The method according to claim 6 comprising presetting colors of the ambient light emitted by the at least one light-emitting unit to correspond to specific colors chosen to identify respective ones of the conversing parties.

8. The method according to claim 6 where the steps of selectively activating one of said transmitters and one of said receivers effects activation of a transmitter and a receiver disposed where the strongest sound reception occurs.

9. The method according to claim 6 where the at least one light emitting unit disposed in the first location is configured to correlate at least one of color, intensity, and pattern of the emitted ambient light with at least one of:
   mood of the conversing party in the second location;
   frame of mind of the conversing party in the second location;
   the distance of the party in the second location from at least one of a transmitter, a receiver or a light emitting unit in the second location;
   content analysis of the conversation;
   volume of the conversing party's speech;
   changes in volume of the conversing party's speech
   activity or passivity of the conversing party;
   physical movement of the conversing party.

10. The method according to claim 9 where the content analysis of the conversation includes the detection of at least one of:
    pauses in the conversation,
    activity from the other conversation party or parties,
    the incidence of filler words,
    the incidence of positive words,
    the incidence of negative words.

11. A non-transitory computer readable medium having embodied thereon a computer program for processing by a computer, the computer program comprising:
    a code segment for selecting one of a plurality of transmitters disposed at different positions in a first location for rendering sound represented by encoded information in a signal communicated from a conversing party in a second location;
    a code segment for selecting one of a plurality of receivers disposed at different positions in the first location from receiving sound from a conversing party in the first location for signal communicated from a conversing party in a second location; and
    a code segment for selecting one of at least one light-emitting unit disposed in the first location and configuring said light-emitting unit to emit ambient light rendering properties represent by encoded information in a signal communicated from the conversing party in the second location, said encoded information being related to at least one of:
    a property of said conversing party;

conversation from said conversing party;
where the selections of one of said transmitters, one of said receivers and one of said at least one light-emitting unit is based on a current position of the conversing party in the first location.

12. A computer program product stored on a non-transitory computer-readable medium comprising software code adapted to effect:

selection of one of a plurality of transmitters disposed at different positions in a first location for rendering sound represented by encoded information in a signal communicated from a conversing party in a second location;

selection of one of a plurality of receivers disposed at different positions in the first location for receiving sound from a conversing party in the first location for encoding in an information signal to be communicated to the conversing party in the second location; and selection of one of at least one light-emitting unit disposed in the first location and configuring said light-emitting unit to emit ambient light rendering properties represented by encoded information in a signal communicated from the conversing party in the second location, said encoded information being related to at least one of:
properties of said conversing party;
conversation from said conversing party;
where the selections of one of said transmitters, one of said receivers and one of said at least one light-emitting unit is based on a current position of the conversing party in the first location.

* * * * *

UNITED STATES PATENT AND TRADEMARK OFFICE
CERTIFICATE OF CORRECTION

PATENT NO. : 8,472,984 B2
APPLICATION NO. : 13/264401
DATED : June 25, 2013
INVENTOR(S) : Jorge Peregrin Emparanza, Aki Sakari Harmi and Pavankumar Murli Dadlani Mahtani It is certified that error appears in the above-identified patent and that said Letters Patent is hereby corrected as shown below:

Col. 9, line 36 (Claim 1, line 20),

Change "transmitters, on of the said receivers and one of said at least..."
To "transmitters, one of said receivers and one of said at least..."

Signed and Sealed this
Eighth Day of December, 2015

Michelle K. Lee
*Director of the United States Patent and Trademark Office*